United States Patent
Stein et al.

(10) Patent No.: US 8,452,055 B2
(45) Date of Patent: *May 28, 2013

(54) COLLISION WARNING SYSTEM

(75) Inventors: Gideon Stein, Jerusalem (IL); Erez Dagan, Jerusalem (IL); Ofer Mano, Modiin (IL); Amnon Shashua, Mevasseret Zion (IL)

(73) Assignee: Mobileye Technologies Limited, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 13/297,907

(22) Filed: Nov. 16, 2011

(65) Prior Publication Data

US 2012/0056735 A1 Mar. 8, 2012

Related U.S. Application Data

(63) Continuation of application No. 10/599,667, filed as application No. PCT/IL2005/000063 on Jan. 19, 2005, now Pat. No. 8,082,101.

(60) Provisional application No. 60/560,049, filed on Apr. 8, 2004.

(51) Int. Cl.
*G06K 9/00* (2006.01)

(52) U.S. Cl.
USPC .......................................... 382/104; 701/301

(58) Field of Classification Search
USPC .......................................... 701/301; 382/104
See application file for complete search history.

(56) References Cited

U.S. PATENT DOCUMENTS

| 5,502,432 A | 3/1996 | Ohmamyuda et al. |
| 5,529,138 A | 6/1996 | Shaw et al. |
| 5,646,612 A | 7/1997 | Byon |
| 6,317,691 B1 | 11/2001 | Narayan et al. |
| 2004/0022416 A1 | 2/2004 | Lemelson et al. |

FOREIGN PATENT DOCUMENTS

| EP | 1741079 B1 | 5/2008 |
| WO | 0139018 A1 | 5/2001 |

OTHER PUBLICATIONS

Stein et al., Vision Based ACC with a Single Camera: Bounds on Range and Range Rate Accuracy, Proceedings on IEEE Intelligent Vehicle Symposium, Jun. 9-11, 2003, pp. 120-125, Columbus, OH.
Lee et al., A theory of visual control of braking based on information about time-to-collision, Perception, 1976, pp. 437-459, vol. 5, Department of Psychology, University of Edinburgh, Edinburgh, Scotland EHB 9TA.
Ito et al., Preceding vehicle and road lanes recognition methods for RCAS using vision system, Proceedings of the Intelligent Vehicles Symposium, Oct. 24-26, 1994, pp. 85-90.
Schwarzinger et al., Vision-Based Car-Following: Detection, Tracking and Identification, Proceedings of the Intelligent Vehicles Symposium, Jun. 29-Jul. 1, 1992, pp. 24-29, Detroit, MI, USA.
International Preliminary Examination Report dated Jul. 27, 2006 in corresponding International Application No. PCT/IL2005/000063.

*Primary Examiner* — John Strege
(74) *Attorney, Agent, or Firm* — The Law Office of Michael E. Kondoudis

(57) ABSTRACT

A method of estimating a time to collision (TTC) of a vehicle with an object comprising: acquiring a plurality of images of the object; and determining a TTC from the images that is responsive to a relative velocity and relative acceleration between the vehicle and the object.

15 Claims, 4 Drawing Sheets

COLLISION WARNING SYSTEM

RELATED APPLICATIONS

The present application is a continuation application of U.S. patent application Ser. No. 10/599,667 filed Oct. 29, 2007 which is a national phase application of international PCT application PCT/IL2005/000063 filed 19 Jan. 2005.

FIELD OF THE INVENTION

The invention relates to methods and systems for estimating a time to collision between a vehicle and an obstacle.

BACKGROUND OF THE INVENTION

Automotive accidents are a major cause of loss of life and dissipation of resources in substantially all societies in which automotive transportation is common. It is estimated that over 10,000,000 people are injured in traffic accidents annually worldwide and that of this number, about 3,000,000 people are severely injured and about 400,000 are killed. A report "The Economic Cost of Motor Vehicle Crashes 1994" by Lawrence J. Blincoe published by the United States National Highway Traffic Safety Administration estimates that motor vehicle crashes in the U.S. in 1994 caused about 5.2 million nonfatal injuries, 40,000 fatal injuries and generated a total economic cost of about $150 billion.

Lack of driver attention and tailgating is estimated to be a cause of about 90% of driver related accidents. Methods and apparatus that would alert a driver to a potential crash and provide him or her with sufficient time to undertake accident avoidance action would substantially moderate automotive accident rates. For example a 1992 study by Daimler-Benz indicates that if passenger car drivers have a 0.5 second additional warning time of an impending rear end collision about 60 percent of such collisions can be prevented. An extra second of warning time would lead to a reduction of about 90 percent of rear-end collisions.

Various systems collision warning/avoidance systems (CWAS) exist for recognizing an impending collision and warning a driver of the danger. U.S. Pat. No. 5,529,138, describes a CWAS that uses a laser radar to determine distance and relative velocity to determine a time to collision of a vehicle with an object. U.S. Pat. No. 5,646,612 describes a CWAS system comprising a laser radar and an infrared (IR) camera. A processor determines a time to collision (TTC) of a vehicle with an object responsive to signals provided by the laser radar and whether the object is a human, an animal or an inanimate object responsive to image data provided by the IR camera. The system operates to warn a driver of an impending collision with an object based on the TTC and kind of object "and properly performs deceleration and braking operations based on a position of the object and a speed of the vehicle is disclosed". The disclosures of the above noted U.S. patents are incorporated herein by reference.

Laser radar systems are relatively complicated systems that are generally expensive and tend to suffer from narrow field of view and relatively poor lateral resolution. PCT Publication WO 01/39018, the disclosure of which is incorporated herein by reference, describes a CWAS that comprises a camera and a processor for processing image data provided by the camera. The camera provides images of an environment in which a vehicle is located and the processor determines a TTC of the vehicle with an obstacle by processing, optionally only, image data provided by the camera. The processor determines the TTC responsive to scale changes in the size of the obstacle as imaged in the images under the assumption that the relative velocity between the vehicle and the object is constant.

SUMMARY OF THE INVENTION

An aspect of some embodiments of the invention relates to providing an improved method and system for determining at a given time t, a time to collision, TTC(t), of a vehicle with an object using a plurality of camera images of an environment in which the vehicle is located.

An aspect of some embodiments of the invention relates to determining TTC(t) of the vehicle with the object by processing image data provided by the images without assuming that relative velocity between the vehicle and the object is substantially constant. In accordance with an embodiment of the invention, image data provided by the plurality of images is processed to provide an estimate of TTC(t), hereinafter Ta(t), which is responsive to the relative acceleration between the vehicle and the object. Optionally, only the image data is used to determine TTC(t).

In accordance with an embodiment of the invention, to determine Ta(t), the image data processed to determine for the given time t, a ratio, hereinafter referred to as relative scale "S(t)", between dimensions of a feature of the object in different images of the plurality of the images. S(t) is used to determine an instantaneous relative velocity estimate for determining TTC(t), hereinafter Tv(t), at the given time. Tv(t) is equal to a distance between the vehicle and the object at time t divided by their instantaneous relative velocity. Tv(t) is estimated from S(t), optionally using methods and algorithms described in PCT Publication WO 01/39018 cited above. According to an aspect of some embodiments of the invention, relative acceleration is expressed as a function of a time derivative T'v(t) of Tv(t) at a given time and Ta(t) is determined as a function of the relative acceleration or a function of T'v(t).

An aspect of some embodiments of the invention relates to determining whether a vehicle is on a collision course with an object responsive, to image data in a plurality of images of the vehicle environment that image the object. Optionally, only the image data is used to determine whether the objects are on a collision course.

In accordance with an embodiment of the invention, the images are processed to determine trajectories for at least two features of the object toward which the vehicle is moving that substantially determine a width of the object parallel to the width of the vehicle. The vehicle and the object are determined to be on a collision course if, as the vehicle and object approach each other, for example as indicated by a value determined for TTC(t), the trajectories of the at least two features bracket at least a portion of the vehicle. In general, the object is another vehicle on the roadway on which the vehicle is moving and the at least two features, which may for example be edges, taillights or headlights of the other vehicle, are optionally features that determine a magnitude for the width of the other vehicle.

There is therefore provided in accordance with an embodiment of the present invention, a method of estimating a time to collision (TTC) of a vehicle with an object comprising: acquiring a plurality of images of the object; and determining a TTC from the images that is responsive to a relative velocity and relative acceleration between the vehicle and the object. Optionally the method comprises determining the relative velocity or a function thereof from the images and using the relative velocity or function thereof to determine TTC.

Optionally, determining the relative velocity or function thereof, comprises determining a change in scale of an image of at least a portion of the object between images of the pluralities of images and using the change in scale to determine the relative velocity or function thereof. Additionally or alternatively the method comprises determining the relative acceleration or a function thereof from the images and using the relative acceleration or function thereof to determine TTC. Optionally, determining the relative acceleration or function thereof comprises determining a time derivative of the relative velocity or the function of the relative velocity.

In some embodiments of the invention, TTC is determined only from information derived from the images.

In some embodiments of the invention, the method comprises determining whether the vehicle and the object are on a course that leads to a collision at the TTC. Optionally, determining whether the vehicle and object are on a collision course comprises: determining motion of at least two features of the object relative to the vehicle from the images; and determining from the relative motions whether at TTC the first and second features straddle at least a part of the vehicle.

There is further provided in accordance with an embodiment of the invention, systems for determining a time to collision (TTC) of a vehicle with an object comprising: at least one camera mounted in the vehicle and adapted for acquiring images of objects in the environment of the vehicle; and a processor that receives image data from the camera and processes the data to determine a TTC in accordance with a method of the invention.

Optionally, the at least one camera comprises a single camera. Additionally or alternatively the system comprises alarm apparatus for alerting a driver of the vehicle to a possible collision with the object responsive to the TTC. In some embodiments of the invention, the system comprises alarm apparatus for alerting persons outside of the vehicle to a possible collision of the vehicle with the object responsive to the TTC. In some embodiments of the invention, the at least one camera images an environment in front of the vehicle. In some embodiments of the invention, the at least one camera images an environment in back of the vehicle. In some embodiments of the invention, the at least one camera images an environment to a side of the vehicle.

There is therefore provided in accordance with an embodiment of the invention, a method of determining whether a first object and a second object are on a collision course comprising: acquiring an image of the second object from a position of the first object at each of a plurality of known times; determining motion of at least two features of the first object relative to the second object from the images; determining an estimate of a possible time to collision (TTC) of the first and second objects; and determining from the relative motions whether at the TTC, the first and second features straddle at least a part of the vehicle and if so that the objects are on a collision course.

Optionally, determining motion of the at least two features comprises determining lateral motion of the features relative to the first object. Optionally, determining whether the features straddle the first object at the TTC comprises extrapolating lateral locations of the features at TTC from their motion at times at which the images are acquired. Optionally, determining TTC comprises determining TTC from the images. In some embodiments of the invention TTC is determined only from the images.

There is further provided in accordance with an embodiment of the invention, a method of determining relative acceleration between a first and second object comprising: acquiring a plurality of images of the second object from locations of the first object; determining a change in scale of an image of at least a portion of the second object between images of the pluralities of images; using the change in scale to determine acceleration or a function of the acceleration. Optionally, the acceleration or function thereof is determined only from data in the images.

BRIEF DESCRIPTION OF FIGURES

Non-limiting examples of embodiments of the present invention are described below with reference to figures attached hereto, which are listed following this paragraph. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION OF EMBODIMENTS OF THE INVENTION

Figure 1:
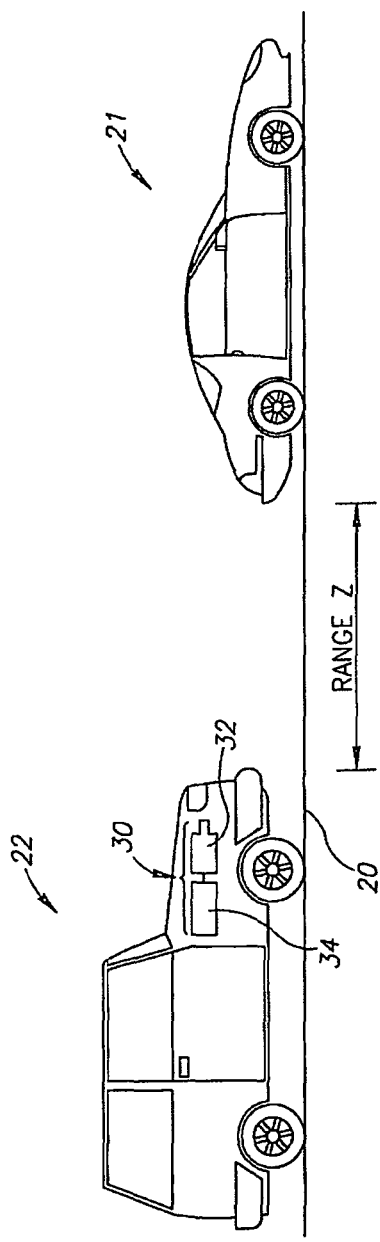
FIG. 1 schematically shows a first "following" vehicle having a collision warning/avoidance system (CWAS), operating to provide a warning of collision with a second "lead" vehicle in front of the following vehicle, in accordance with an embodiment of the present invention.

FIG. 1 schematically shows a first, lead vehicle 21 traveling along a road 20 followed by a second, following vehicle 22 having a CWAS 30 in accordance with an embodiment of the present invention. CWAS 30 comprises a camera 32 that images, by way of example, the environment in front of following vehicle 22 and a processor 34 that processes image data provided by the camera to repeatedly update an estimate of a time to collision (TTC) of a possible rear end collision of following vehicle 22 with lead vehicle 21. CWAS 30 comprises at least one device (not shown), for alerting a driver of following vehicle 22 to a possible collision with an object in front of the vehicle responsive to estimates of TTC provided by processor 34.

At any given time t lead and following vehicles 21 and 22 are separated by a distance S(t), hereinafter also referred to as "range", have a relative velocity V(t), which is changing with a relative acceleration a(t) (which may of course be zero). In accordance with an embodiment of the invention, at time t processor 34 determines an estimate of time to collision TTC(t) to be equal to Ta(t), which is an estimate responsive to relative acceleration a(t), between lead vehicle 21 and following vehicle 22 at the given time.

In accordance with an embodiment of the invention, processor 34 processes image data from a plurality of images to provide an estimate of relative scale S(t). Processor 34 determines S(t) from a ratio of dimensions of a feature of lead vehicle 21 in at least two different images of the lead vehicle acquired by camera 32 at times close to the given time. For example, assume that at first and second times t1 and t2, which define a time interval Δt that optionally includes the given time t, camera 32 acquires first and second images respectively of lead vehicle 21. Let a distance between two features of lead vehicle 21, or a dimension of a feature of the lead vehicle, such as for example width of the lead vehicle, have a length (as measured for example in pixels or millimeters) in the first and second images represented by w(t1) and w(t2) respectively. Then, optionally, $$S(t)=w(t2)/w(t1). \tag{1}$$

If at times t1 and t2 the lead and following vehicles 21 and 22 are separated by distances, i.e. "ranges", Z(t1) and Z(t2) respectively, then assuming perspective projection of a scene imaged by camera 32 on a photosensitive surface of the camera $$S(t)=Z(t1)/Z(t2). \tag{2}$$

If the vehicles have an average relative velocity (assumed negative if distance between the vehicles is decreasing and positive if distance is increasing) V(t) during the time interval Δt, then assuming that Δt is relatively small, Z(t1)=[Z(t2)−V(t)Δt] and S(t) may be written $$S(t)=[Z(t2)-V(t)\Delta t]/Z(t2), \tag{3}$$

from which it can be shown after relatively straightforward manipulation, $$Z(t2)/V(t)=-\Delta t/(S(t)-1). \tag{4}$$

Assuming that relative acceleration between lead and following vehicles 21 and 22 is zero (or that time to collision TTC(t) is independent of relative acceleration) TTC(t) for vehicles 21 and 22 may be estimated as equal to Tv(t), where $$Tv(t)=-Z(t)/V(t)=-Z(t2)/V(t)=\Delta t/(S(t)-1), \tag{5}$$

(it is recalled that V(t) is defined negative if the vehicles are getting closer to each other).

The foregoing derivation of TTC(t)=Tv(t), which assumes relative acceleration equal to zero and results in TTC(t) being dependent only on the instantaneous velocity, is based on the analysis presented in WO 01/39018 cited above.

Abandoning the assumption of zero acceleration, in accordance with an embodiment of the present invention, TTC(t) is estimated as equal to Ta(t), which has a value optionally determined responsive to an equation of the form, $$Z(t+Ta(t))=0=Z(t)+V(t)Ta(t)+0.5a(t)Ta(t)^2. \tag{6}$$

Equation 6 assumes that from time t until collision, relative acceleration between lead and following vehicles 21 and 22 is constant and equal to a(t) and that following time t by a time lapse equal to Ta(t), range is equal to zero, i.e. the vehicles have contacted.

Solving equation 6 for Ta(t) provides an expression:

$$Ta(t)=(-V(t)+[V(t)^2-2Z(t)a(t)]^{1/2})/a(t). \tag{7}$$

To evaluate Ta(t) the inventors have noted that a time derivative T'v(t) of Tv(t) may be written (note equation 5 above), $$T'v(t)=d(-Z(t)/V(t))/dt=-Z'(t)/V(t)+Z(t)a(t)/V(t)^2=(a(t)Z(t)/V(t)^2)-1 \tag{8}$$

It is convenient to define a parameter C(t), where $$C(t)=T'v(t)+1=a(t)Z(t)/V(t)^2, \tag{9}$$

from which, $$a(t)=C(t)V(t)^2/Z(t). \tag{10}$$

Substituting the expression for a(t) from equation 10 into the expression for Ta(t) from equation 7, manipulating the results and using the expression Tv(t) from equation 5 provides a "compact" expression for Ta(t), namely $$Ta(t)=[Tv(t)/C(t)][1-(1+2C(t)]^{1/2}. \tag{11}$$

In the above expressions, Tv(t) is optionally approximated by −Z(t2)/V(t)=Δt/(S(t)-1) (equation 5 above). T'v(t) is optionally determined by determining a time derivative responsive to values of Tv(t) determined in accordance with equation 5 for a plurality of different times t. For example, optionally, a plurality of values of Tv(t) determined for a plurality of different times t, optionally before a given time t, are used to determine, using any of various methods known in the art, an analytic curve for Tv(t) as a function of time. The time derivative of the analytic curve evaluated for the given time t provides T'v(t) for the given time.

To provide a numerical example that compares determining TTC(t)=Ta(t), in accordance with an embodiment of the present invention, with determining TTC(t) in accordance with prior art in which TTC(t)=Tv(t), assume that two vehicles are traveling at a same velocity equal to 70 kmph. Assume that the vehicles are separated by a range equal to 50 m and that at a time t=0 the "lead" driver of lead vehicle 21 spots an obstacle on road 20 and "hits" the brakes to decelerate at a maximum, constant, deceleration equal to 7.5 m/s$^2$ to stop the lead vehicle. Assume that at the time that the lead driver hits his or her brakes, the driver of following vehicle 22 has shifted his or her attention from the road in front of him or her and is looking at a road sign at the side of the road. As a result, the "following" driver does not notice the brake lights of lead vehicle 21 turning on at t=0 when the lead driver hits the brakes or does not pay sufficient attention to the brake lights of the lead vehicle turning on. The driver of following vehicle 22 must rely on CWAS 30 to provide a warning of a possible rear end collision with lead vehicle 21 with sufficient lead-time to prevent the collision. Finally, assume that when alerted, the "following" driver applies the brakes to decelerate following vehicle 22, also at a constant deceleration of 7.5 m/s$^2$ and that from a time at which the following driver is alerted to a danger there is a lag reaction time of about 1.6 seconds until the driver effectively applies the brakes of the following vehicle. (Driver reaction times are noted on page 27 of "Vehicle and Infrastructure-Based Technology for the Prevention of Rear-End Collisions"; Special Investigation Report, No. PB2001-917003, published by the National Transportation Safety Board, Washington D.C. May 1, 2001. On page 27 the report notes that "typical driver perception-reaction time ranges from 0.9 to 2.1 seconds with the 95-th percentile reaction time of 1.6 seconds")

Figure 2:
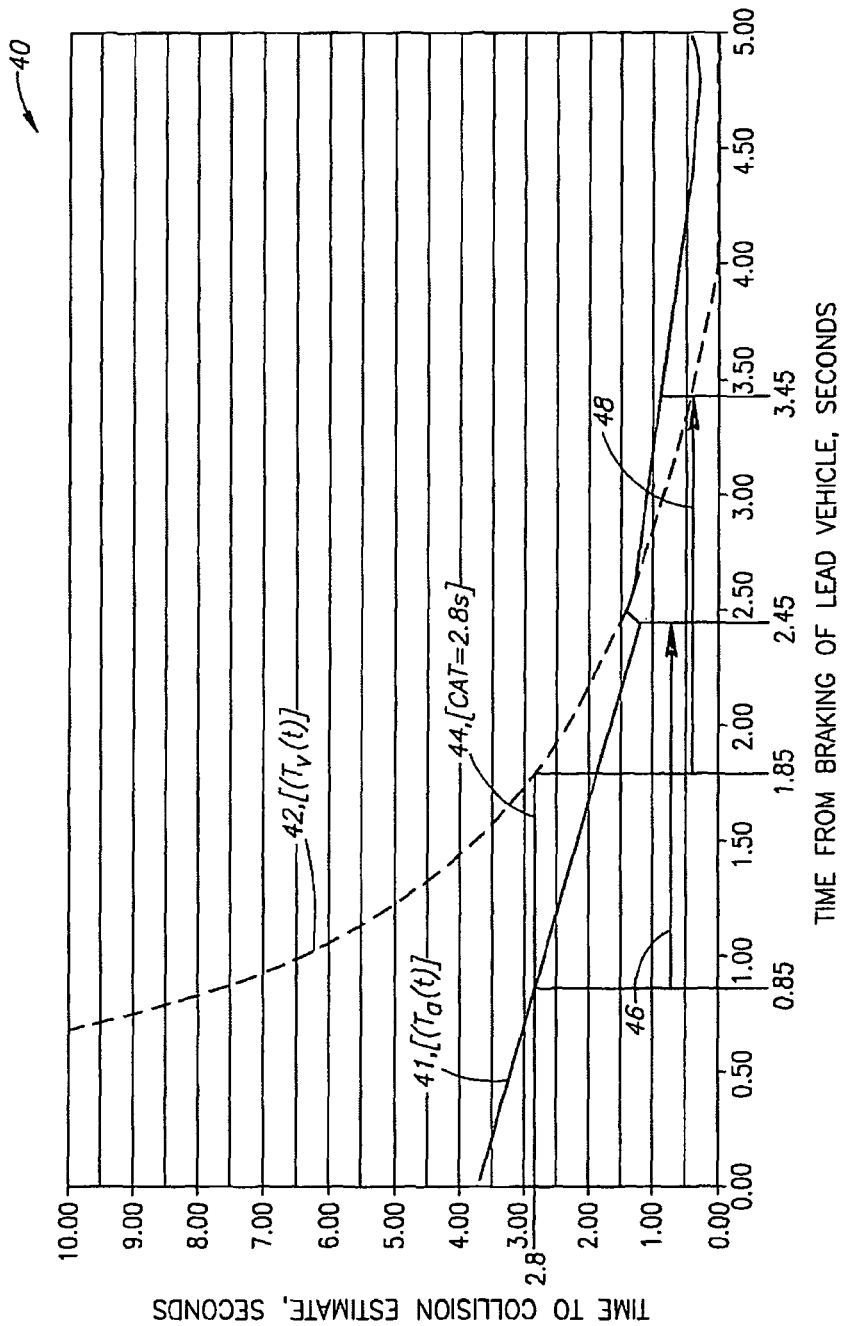
FIG. 2 shows a graph that provides a comparison between TTC(t) for the vehicles shown in FIG. 1 determined equal to Tv(t) in accordance with prior art and TTC(t) determined equal to Ta(t), in accordance with an embodiment of the present invention.

FIG. 2 shows a graph 40 that provides a comparison between TTC(t) determined equal to Tv(t) and TTC(t) determined equal to Ta(t) in accordance with an embodiment of the present invention, subject to the assumptions described in the preceding paragraph. Curves 41 and 42 give values of Ta(t) and Tv(t) noted along the left hand ordinate of graph 40 as functions of time noted along the abscissa of the graph from the time t=0 at which lead driver of lead vehicle 21 applies the brakes. By way of example, it is assumed that CWAS 30 activates an alarm to alert a driver of following vehicle 22 to a possible collision if its evaluated TTC(t) is equal to or less than a collision alarm time (CAT) of about 2.8 seconds. CAT equal to 2.8 seconds is indicated in graph 40 by a line 44. From curve 41 and CAT line 44 it is seen that CWAS 30 alerts the driver of following vehicle 22 to a possible rear end collision with lead vehicle 21, in accordance with an embodiment of the invention, about 0.85 seconds after the driver of the lead vehicle has applied the brakes.

Because of the 1.6 seconds lag in reaction time, the following driver manages to apply the brakes only at a time 2.45 seconds after the lead driver applies the brakes to lead vehicle 21. An arrow 46 indicates the elapsed time between the time at which the alert is given in accordance with an embodiment of the invention and a time at which the following driver applies the brakes. The discontinuity in Ta(t) occurs at a time at which the following driver applies the brakes and for a short period of time while lead vehicle 21 is still decelerating and the lead vehicle has not come to a full stop, the relative acceleration is zero. Similarly, from curve 42 it is seen that were CWAS 30 to alert the driver in accordance with prior art, i.e. TTC(t)=Tv(t), the following driver would be alerted to a possible collision at a time about 1.85 seconds after the driver of lead vehicle 21 applied the brakes. The alert provided by prior art is given almost a full second later than the alert provided by an embodiment of the invention and the following driver would only apply the brakes at a time of about 3.45 seconds after the lead driver applies the brakes. An arrow 48 indicates the elapsed time between the time at which the alert is given in accordance with prior art and a time at which the following driver applies the brakes.

The import of the added warning time afforded the driver by an embodiment of the present invention is that the driver of following vehicle 22 avoids a collision with lead vehicle 21 that the driver would not avoid given an alert based on TTC(t)=Tv(t).

Figure 3:
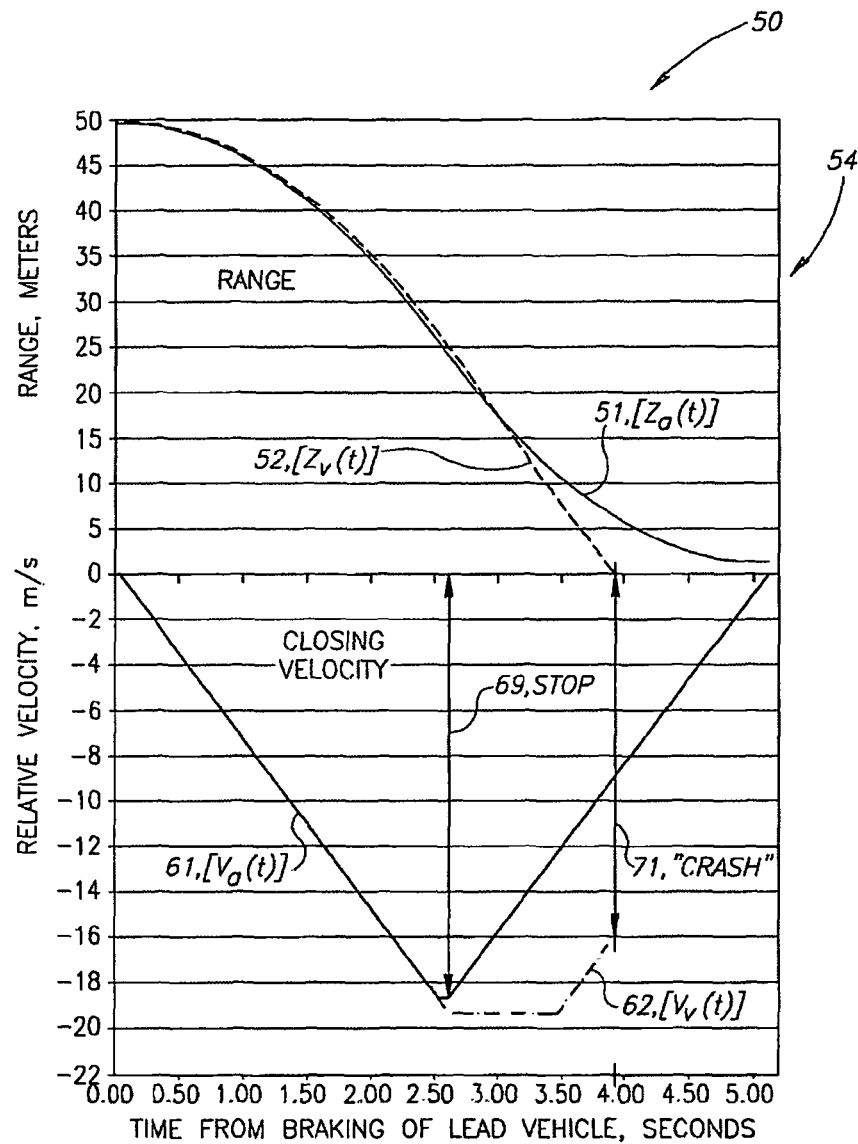
FIG. 3 shows a graph that compares the results of alerting the driver of the following vehicle to a possible collision with the lead vehicle in accordance with prior art and alerting the driver to a possible collision in accordance with the present invention.

FIG. 3 shows a graph 50 that compares the results of alerting the driver in accordance with an embodiment of the present invention, i.e. TTC(t)=Ta(t), for CAT=2.8 seconds with results of alerting the driver in accordance with prior art i.e. TTC(t)=Tv(t) for the same CAT. Curve 51, also labeled Za(t) in an upper portion 54 of graph 50 gives range between lead vehicle 21 and following vehicle 22 as a function of time after the driver in lead vehicle 21 applies the brakes for the case in which the driver of following vehicle 22 applies the brakes after being alerted by CWAS 30, in accordance with an embodiment of the invention. Curve 61, also labeled Va(t), in a bottom part 64 of graph 50, corresponds to curve 51 and gives the relative velocity between lead and following vehicle 21 and 22 for the case where the driver of following vehicle 22 applies the brakes responsive to an alert in accordance with the invention. Curve 52, also labeled Zv(t), in upper portion 54 of graph 50 gives range between lead vehicle 21 and following vehicle 22 were the driver in following vehicle 22 to apply the brakes responsive to an alert in accordance with the prior art. Curve 62 in bottom part 64 corresponds to curve 52 and gives the relative velocity Vv(t) between the lead and following vehicles were the driver of following vehicle 22 to apply the brakes responsive to an alert based on the prior art.

Curve 51 shows that range Za(t) between lead and following vehicles never reaches zero, but instead both vehicles come to a full stop with a range between the vehicles equal to about 0.4 m at a time equal to about 5.2 seconds after the lead driver applies the brakes. Curve 61 shows that relative velocity Va(t), which is equal to zero before the driver of lead vehicle 21 applies the brakes (both lead and following vehicles 21 and 22 are traveling at a same velocity), decreases rapidly during a period in which lead vehicle 21 is decelerating after being braked until a time at which the driver of following vehicle 22 manages to apply the brakes. Thereafter, for a short time, until lead vehicle 21 comes to a full stop, relative velocity is constant while both vehicles lead and following vehicles 21 and 22 decelerate at a same acceleration (7.5 m/s$^2$) and relative acceleration is zero. After lead vehicle 21 comes to a stop at a time indicated by an arrow witness line 69 also labeled with the word "STOP", the relative velocity increases rapidly to zero as deceleration of following vehicle 22 provides a positive relative acceleration.

Curves 52 and 62 indicate a substantially different scenario than curves 51 and 61. Curve 51 shows that range Zv(t) crosses zero and following vehicle 22 "meets" lead vehicle 21 at a time equal to about 4 seconds indicated by an arrow witness line 71, also labeled "CRASH". Curve 62 shows that at the time that the vehicles meet, the magnitude of relative acceleration Vv(t) is quite large, indicating that following vehicle 22 does not contact lead vehicle 21 gently, but crashes into lead vehicle with substantial force. It is noted that whereas in the above described scenario, sufficient warning is provided by CWAS 30 to prevent a crash, a warning in accordance with an embodiment of the invention, if not sufficient to prevent a crash, will in general provide relatively more time to mitigate severity of a crash.

Whereas a method in accordance with an embodiment the invention for determining TTC(t) in accordance with Ta(t) can provide an improved determination of TTC(t), it does not by itself determine whether, if no action is taken by a driver, a collision will actually occur. For example, a lead vehicle may be located in a driving lane adjacent to that in which a following vehicle is located. A CWAS in the following vehicle, using only a method similar to that described above, may determine that the following vehicle will rear-end the lead vehicle at a particular TTC, when in fact the following vehicle is not on a collision course with the lead vehicle but will just pass the lead vehicle at the particular TTC.

In accordance with an embodiment of the invention, a CWAS installed in a vehicle processes images provided by its camera not only to determine a TTC for the vehicle with an object, but also to determine whether the object and the vehicle are on a collision course. In accordance with an embodiment of the invention, the CWAS's processor determines trajectories for at least two features of an object with which the vehicle is closing that substantially determine a width of the object parallel to the width of the vehicle. The CWAS determines that the vehicle and the object are on a collision course if, as the vehicle and object approach each other, for example as indicated by TTC(t)=Ta(t), the trajectories of the at least two features bracket at least a portion of the vehicle comprising the CWAS. Usually, the object is another vehicle on the roadway on which the vehicle comprising the CWAS is moving and the at least two features, which may for example be edges, taillights or headlights of the other vehicle, are optionally features that determine a magnitude of the width of the other vehicle.

Figure 4:
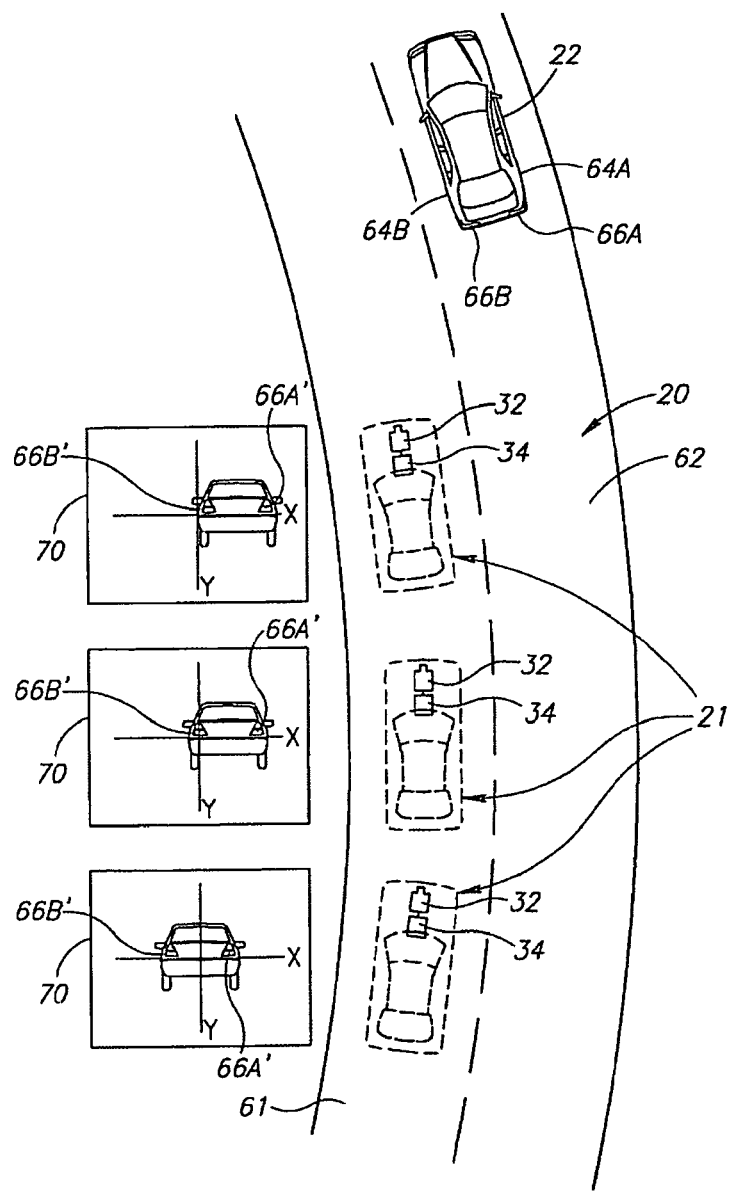
FIG. 4 schematically illustrates determining whether a vehicle is on a collision course with another vehicle, in accordance with an embodiment of the present invention.

FIG. 4 is a schematic birds-eye view of lead and following vehicles 21 and 22 on road 20 shown in FIG. 1 and illustrates a situation in which a CWAS, e.g. CWAS 30, in accordance with an embodiment of the invention operates to determine if the two vehicles are on a collision course.

It is assumed, by way of example, that road 20 is a two lane highway that curves to the left and that lead vehicle 21 is in a right hand lane 61 and following vehicle 22 is in a left hand passing lane 62. Lanes 61 and 62 are separated by lane markings 63. Following vehicle 22 is accelerating, or has accelerated, to a passing velocity in order to pass lead vehicle 22 and is schematically shown in dashed lines at three different locations on highway 20 relative to lead vehicle 21 as the following vehicle passes the lead vehicle. Optionally, CWAS 34 is operating to update TTC(t) for following and passing vehicles 21 and 22 in accordance with an embodiment of the invention and determines TTC(t)=Ta(t).

In accordance with an embodiment of the invention, processor 34 processes images provided by camera 32 to identify and locate at least two features that determine a width of lead vehicle 21 in each of a plurality of the images. Any of many various pattern recognition algorithms known in the art may be used to identify the features. For example, an edge detection algorithm may be used to identify edges 64A and 66B of lead vehicle 22 or taillights 66A and 66B that are separated by a distance substantially equal to the width of the vehicle. By way of example, it is assumed that processor 34 identifies and locates taillights 66A and 66B of lead vehicle 22 in each of a plurality of images as following vehicle 22 passes lead vehicle 21.

In FIG. 4 lead vehicle 21 is schematically shown in an image 70 acquired by camera 32 at each of the positions of following vehicle 22 shown in the figure. For each position of vehicle 21, image 70 acquired at the position is shown immediately to the left of the vehicle. Features in images 70 are optionally located relative to an image x-y coordinate system having a center 72 located at a point in the images corresponding to the optic axis of camera 32. As following vehicle 22 draws near to lead vehicle 21, "taillight images" 66A' and 66B' of taillights 66A and 66B respectively move progressively to the right of center 72 along the x-axis. In accordance with an embodiment of the invention, processor 34 processes images 70 to determine whether motion of taillight images 66A' and 66B' along the x-axis of images acquired by camera 32 indicate whether vehicles 21 and 22 are on a collision course.

Let the x-coordinates taillight images 66A' and 66B' in each of the images acquired by camera 32 be represented by xa(t) and xb(t) and let corresponding real space x-coordinates of taillights 66A and 66B relative to the location of camera 32 in vehicle 21 be respectively XA(t) and XB(t). For convenience of presentation the real space x-coordinate, XC, of camera 32 is defined equal to zero (i.e. the camera is at the origin of coordinates). At some initial time, to, at which a first image 70 of lead vehicle 21 is acquired by camera 32, the x-coordinates of taillight images 66A' and 66B' are xa(to) and xb(to) and let the range at time to of the lead vehicle relative to following vehicle 22 be Z(to). Using perspective projection it can be shown that the range Z(t) of lead vehicle 21 at a time t later than to may be expressed, $$Z(t)=[xa(t)-xb(t)]Z(to)/[xa(to)-xb(to)]. \quad (12)$$

Using equation 12, the real space x-coordinates of taillights 66A and 66B may be written, $$XA(t)=(xa(t)Z(to)/f)([xa(to)-xb(to)]Z(to)/[xa(t)-xb(t)]) \quad (13)$$

$$XB(t)=(xb(t)Z(to)/f)([xa(to)-xb(to)]Z(to)/[xa(t)-xb(t)]), \quad (14)$$

where f is the focal length of camera 32.

In accordance with an embodiment of the invention, processor 34 processes image data provided by camera 32 to determine values for xa(ti) and xb(ti) and therefrom XA(ti) and XB(ti) responsive to equations 13 and 14 at a plurality of times ti equal to and greater than to. At a given time t, the processor extrapolates the determined values for XA(ti) and XB(ti) to provide values for XA(TTC(t)) and XB(TTC(t)). Optionally, TTC(t)=Ta(t). In accordance with an embodiment of the invention, if XA(TTC(t)) and XB(TTC(t)) straddle the coordinate XC of camera 32 (i.e. have opposite signs assuming XC=0) then processor 32 determines that lead and following vehicles 21 and 22 are on a collision course.

It is noted that since a sufficient condition for XA(TTC(t)) and XB(TTC(t)) to straddle XC is that they have opposite signs, processor 32 can use an arbitrary value for Z(to) when determining if they straddle XC. However, if both XA(TTC(t)) and XB(TTC(t)) lie to the left or the right of XC, processor 32 cannot determine for sure, responsive only to equations 13 and 14 if lead and following vehicles 21 and 22 are, or are not, on a collision course without a realistic value for Z(to). For a given set of values for xa(ti) and xb(ti), Z(to) determines magnitudes of displacement of XA(TTC(t)) and XB(TTC(t)) from XC. In particular, if both XA(TTC(t)) and XB(TTC(t)) are displaced to a same, one side of XC, Z(to) determines if they are displaced sufficiently so that vehicles do not collide. In some embodiments of the invention, processor 34 processes images 70 using methods described in "Vision Based ACC with a single Camera: Bounds on Range and Range Rate Accuracy"; G. P. Stein, O. Mano and A. Shashua; Proceedings of IEEE Intelligent Vehicles Symposium (IV2003), pages 120-125, Jun. 9-11, 2003, Columbus, Ohio. USA; the disclosure of which is incorporated herein by reference, to determine a value for Z(to). For relatively short ranges up to about 20 to 30 meters motion parallax may optionally be used to determine a value for Z(to).

Whereas in the above description of exemplary embodiments of the invention a CWAS was installed in the front end of a vehicle to alert the vehicle's driver to a possible collision with an object in front of the vehicle, a CWAS in accordance with an embodiment of the invention may of course be installed elsewhere in a vehicle. For example, a CWAS may be installed in the rear of a vehicle to alert the driver to a possible rear end collision or in the sides of the vehicle to alert the driver to possible side collisions. A CWAS installed in such locations of a vehicle may provide a driver with sufficient time to enable him to take action that might mitigate severity of a rear end or side collision.

A CWAS in accordance with an embodiment of the invention may operate any of various alarms, for example audio, visual or tactile alarms, to alert a driver to a possible collision. However, it is noted that a possible collision between a vehicle comprising a CWAS and another vehicle, will in general have potential to affect more than the driver and occupants of the vehicle outfitted with the CWAS. The possible collision does of course have substantial potential to affect the driver and occupants of the other vehicle and persons in the immediate environment of the vehicles. Furthermore, were the driver of the other vehicle and persons in the immediate environment made aware of the possible collision in which they may be participants, they might be able to take action that contributes to avoiding the collision or mitigating its effects.

Therefore, in accordance with some embodiments of the invention, a CWAS is configured to alert persons other than the driver of the vehicle in which it is installed to a potential collision. When a possible collision is anticipated by the CWAS it optionally operates an alarm or alarms that alert drivers of other vehicles and pedestrians in the environment of the vehicle to the possible collision. For example, the CWAS may control the vehicle's horn to generate a particular type of audio alarm or the vehicles lights to flash warning signals.

It is noted that whereas in the exemplary embodiments, a CWAS is described as processing images provided by its camera to determine whether to alert a driver to a potential collision, a CWAS in accordance with an embodiment of the invention may process data additional to image data to determine risk of a potential collision. For example, the CWAS may use data provided by a vehicle's speedometer, or sensors that generate signals responsive to operation of the vehicle's brakes or gas pedal to determine risk of a collision.

In addition, a CWAS in accordance with some embodiments of the invention may perform functions other than to warn a driver and optionally other persons of an impending collision. For example, if the CWAS determines responsive to a TTC that risk of a collision is greater than a predetermined risk level and that driver is not undertaking any collision avoidance action, the CWAS may be equipped to apply the brakes.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

We claim:

1. A method of estimating a time-to-collision (TTC) of a vehicle with an object using a system including a camera and a processor mountable in a motor vehicle the method comprising:
    acquiring from the camera a plurality of images of the object at known time intervals;
    determining a relative scale of the object in the images;
    determining a function of relative velocity and relative acceleration between the vehicle and the object from the relative scale and die time intervals; and
    determining the time-to-collision (TTC) based on the function of the relative velocity and the relative acceleration.

2. The method of claim 1, wherein said relative scale includes a ratio between respective dimensions of a feature of the object in different images of the plurality of the images.

3. The method of claim 1, wherein the relative velocity and relative acceleration are determined from data from the images.

4. The method of claim 1, wherein said determining the relative scale and said determining the time-to-collision are performed while avoiding a real-space distance measurement to the object and while avoiding a real-space dimension measurement of the object.

5. The method of claim 1, wherein only data from the images are used for said determining the time-to-collision (TTC).

6. The method of claim 1, further comprising:
    alerting a driver of the vehicle to a possible collision of the vehicle with the object responsive to the TTC.

7. The method of claim 1, further comprising:
    determining whether the vehicle and the object are on a course that leads to a collision at the TTC.

8. A system for estimating a time-to-collision collision, the system including a camera and a processor mountable in a motor vehicle, the system operable to:
    acquire from the camera a plurality of images of the object at known time intervals;
    determine a relative scale of the object in the images;
    determine a function of relative velocity and relative acceleration between the vehicle and the object from the relative scale and the time intervals; and
    determine the time-to-collision (TTC) based on the function relative velocity and the relative acceleration.

9. The system of claim 8, wherein said relative scale includes a ratio between respective dimensions of a feature of the object in different images of the plurality of the images.

10. The system of claim 8, wherein the relative velocity and relative acceleration are determined from data from the images.

11. The system of claim 8, wherein the camera is a single camera.

12. The system of claim 8, further comprising;
    an alarm apparatus operatively connected to the processor, wherein said alarm apparatus is configured based on the TTC, to alert a driver of the vehicle of a possible collision of the vehicle with the object.

13. A system for alerting a driver to a possible collision with an object, the system comprising:
    a camera and a processor mountable in a motor vehicle, the system operable to:
    acquire a plurality of images of the object at known time intervals;
    determine the time-to-collision (TTC) based on data from the images and the time intervals; and
    determine motion of at least two features of the object relative to the vehicle from the images; and
    determine from the relative motions at the time-to-collision, if the real space horizontal coordinates of said at least two features straddle the real-space horizontal coordinate of at least a part of the vehicle.

14. The system of claim 13, wherein the system is operable to:
    determine a relative scale of the object in the images;
    determine a function of relative velocity between the vehicle and object from the relative scale and the time intervals; and
    determine the time-to-collision (TCC) based on the function of the relative velocity.

15. The system of claim 13, wherein the system is operable to:
    determine a relative scale of the object in the images;
    determine a function of relative velocity and relative acceleration between the vehicle and the object from the relative scale and the time intervals; and
    determine the time-to-collision (TTC) based on the function of the relative velocity and the relative acceleration.

* * * * *

UNITED STATES PATENT AND TRADEMARK OFFICE
CERTIFICATE OF CORRECTION

PATENT NO. : 8,452,055 B2  
APPLICATION NO. : 13/297907  
DATED : May 28, 2013  
INVENTOR(S) : Stein et al.

Page 1 of 1

It is certified that error appears in the above-identified patent and that said Letters Patent is hereby corrected as shown below:

In the Claims:

In claim 1, column 11, line 35, "and die time" should read --and the time--;

In claim 3, column 11, line 41, "relative acceleration" should read --the relative acceleration--;

In claim 8, column 12, line 1, "collision collision" should read --collision--;

In claim 8, column 12, line 6, "the object" should read --an object--;

In claim 8, column 12, lines 10-11, "the function relative velocity" should read --the function of relative velocity--;

In claim 10, column 12, line 17, "relative acceleration" should read --the relative acceleration--;

In claim 13, column 12, line 38, "if the real space" should read --if real space--.

Signed and Sealed this  
Sixth Day of August, 2013

Teresa Stanek Rea  
*Acting Director of the United States Patent and Trademark Office*